United States Patent
Cox

(10) Patent No.: US 7,938,039 B2
(45) Date of Patent: May 10, 2011

(54) SELF LOCKING CABLE CONTROL APPARATUS

(75) Inventor: Marvin Cox, Wichita, KS (US)

(73) Assignee: Wescon Products Company, Wichita, KS (US)

( * ) Notice: Subject to any disclaimer, the term of this patent is extended or adjusted under 35 U.S.C. 154(b) by 1082 days.

(21) Appl. No.: 11/683,366

(22) Filed: Mar. 7, 2007

(65) Prior Publication Data
US 2007/0232129 A1  Oct. 4, 2007

Related U.S. Application Data

(60) Provisional application No. 60/786,854, filed on Mar. 29, 2006.

(51) Int. Cl.
*F16C 1/12* (2006.01)

(52) U.S. Cl. .................................................. 74/501.6

(58) Field of Classification Search ................ 74/473.1, 74/473.14, 473.15, 473.3, 501.6, 502.2, 519, 74/523, 527; 303/141; 180/19.3; 440/84, 440/86, 87; 56/10.8, 11.3
See application file for complete search history.

(56) References Cited

U.S. PATENT DOCUMENTS

| | | | |
|---|---|---|---|
| 4,363,206 A | 12/1982 | Schmitt | |
| 4,466,232 A | 8/1984 | Beugelsdyk et al. | |
| 4,466,308 A | 8/1984 | Kester et al. | |
| 4,591,017 A * | 5/1986 | Enjo et al. | 180/205 |
| 4,658,667 A * | 4/1987 | Schuller | 74/473.14 |
| 4,753,062 A * | 6/1988 | Roelle | 56/10.5 |
| 4,813,214 A | 3/1989 | Barnard et al. | |
| 4,833,935 A * | 5/1989 | Roelle | 74/483 R |
| 4,850,182 A | 7/1989 | Barnard et al. | |
| 4,854,187 A * | 8/1989 | Walters | 74/535 |
| 5,321,994 A | 6/1994 | Barnard | |
| 5,467,583 A | 11/1995 | Beugelsdyk et al. | |
| 5,553,822 A | 9/1996 | Barnard et al. | |
| 5,596,909 A | 1/1997 | Cox et al. | |
| 5,657,669 A | 8/1997 | Barnard | |
| 5,701,967 A | 12/1997 | Barnard | |
| 5,813,284 A | 9/1998 | Cox | |
| 6,354,170 B1 | 3/2002 | Beugelsdyk et al. | |

* cited by examiner

*Primary Examiner* — Vicky A Johnson
(74) *Attorney, Agent, or Firm* — Hovey Williams LLP

(57) ABSTRACT

A cable control assembly is beneficially adapted for shifting controllable mechanisms, such as a power take-off unit, between two conditions, an initial position and an actuated position. The cable control assembly preferably includes a housing, a handle extending from the housing, a driving member, a driven member, and a locking member such as a pawl. Upon shifting of the handle from an initial position to an actuated position, the driving member shifts the driven member, which is operatively coupled to the control cable. Upon reaching the actuated position, the locking member holds the driven member in the actuated position without transmitting a tensioning force applied to the control cable to the driving member. Return of the driving member in a direction toward the initial position automatically causes the locking member to move free of the driven member and enable return of the driven member and control cable to the initial position without other unlocking steps.

16 Claims, 6 Drawing Sheets

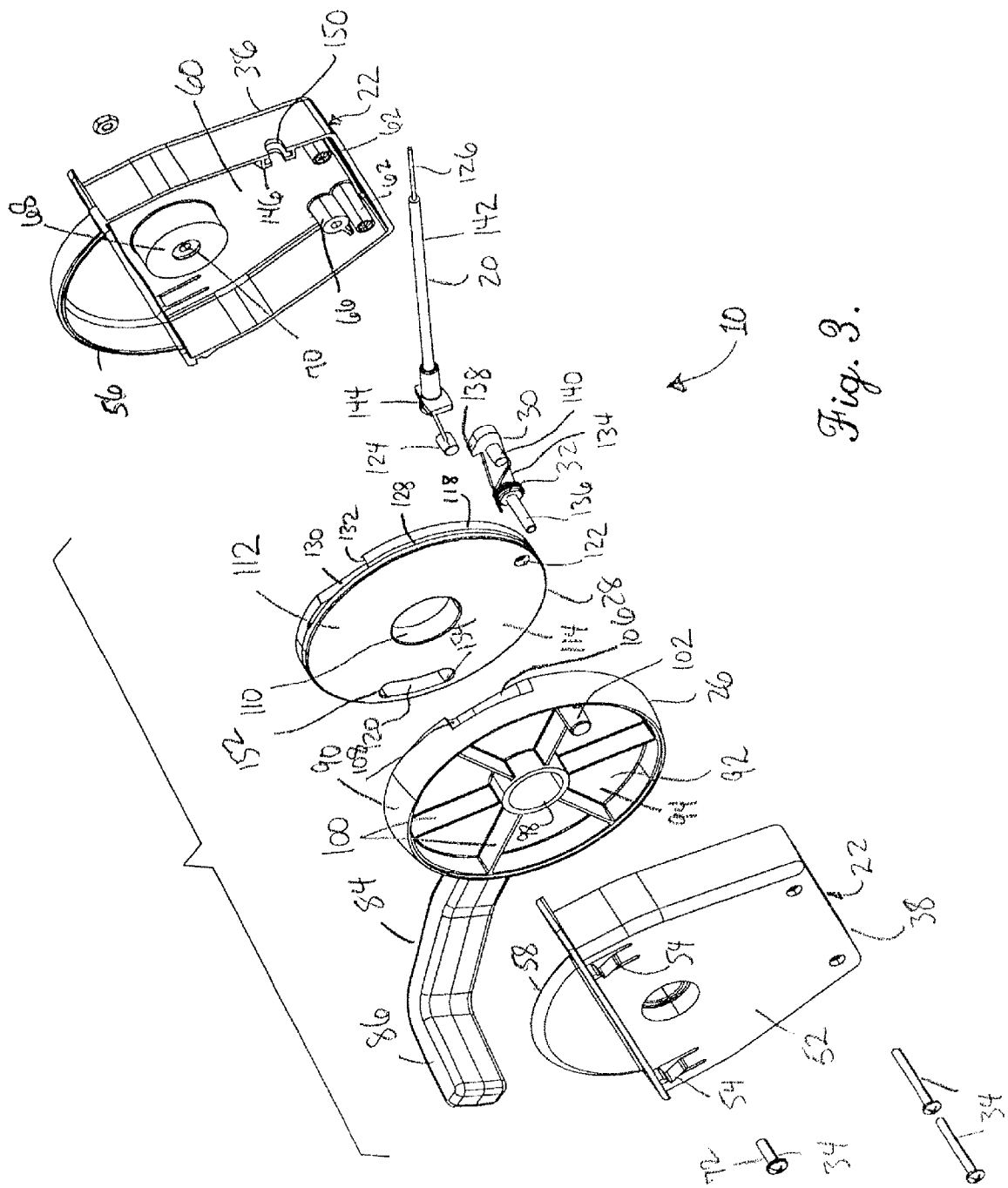

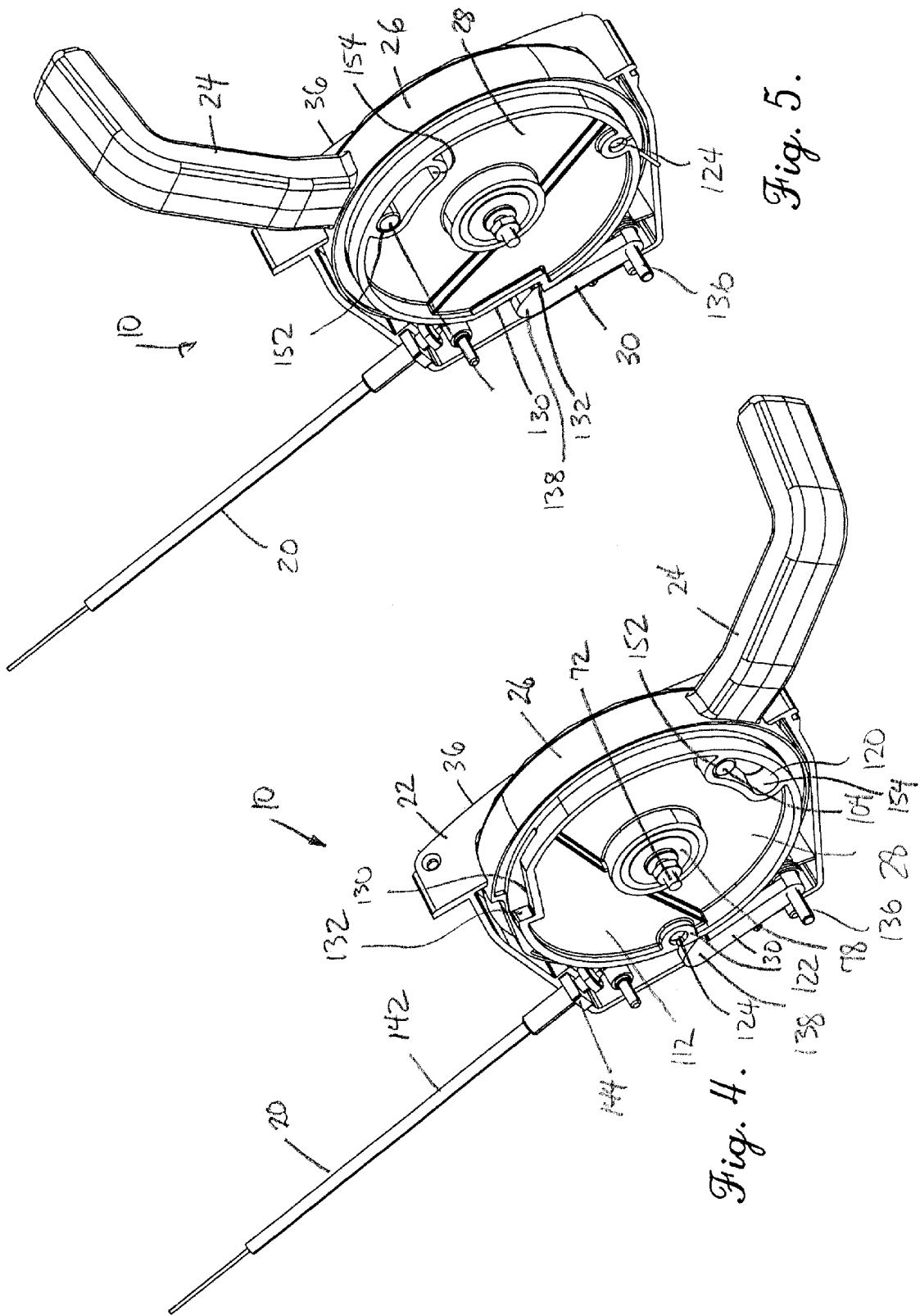

SELF LOCKING CABLE CONTROL APPARATUS

This application claims the benefit of U.S. Provisional Application No. 60/786,854 filed Mar. 29, 2006.

BACKGROUND OF THE INVENTION

1. Field of the Invention

The present invention broadly concerns a cable control apparatus for use in actuating control cables which includes a self locking structure to retain and release a control cable in and from an actuated position in response to handle movement. More particularly, it is concerned with a cable control apparatus for use with a control cable able to retain the control cable in an actuated condition notwithstanding substantial cable tension by virtue of an internal pawl arm acting on a pivoting spool.

2. Description of the Prior Art

Control cables are widely used in a variety of different applications for remotely controlling mechanisms such as throttles, brakes, chokes and the like. The control cable assembly is often known as a Bowden cable and includes an outer sheath and an internal control cable which is shiftable relative to the sheath. A variety of different controls are well known to those skilled in the art, including those shown and described in U.S. Pat. Nos. 4,363,206, 4,466,232, 4,466,308, 4,813,214, 4,850,182, 5,321,994, 5,467,583, 5,553,822, 5,596,909, 5,657,669, 5,701,967, 5,813,284, and 6,354,170, the disclosures of which are incorporated herein by reference.

In some other applications, the force exerted by the mechanism to be controlled has been considered too great, or the length of travel of the controlled mechanism too great to be effective for use with a control cable. For example, in some applications such as a power take-off (PTO) used in a lawn, garden or lightweight utility tractor, a lever with an overcenter retention feature has been used because the tension force exerted by the mechanism was considered too great for the use of a Bowden cable. Some of the considerations in this regard included the force necessary to actuate the lever either to engage or release the mechanism, and the force which must be borne by the control cable assembly in order to successfully retain the control cable and thus the mechanism in an actuated (or released) condition.

Accordingly, there has developed a need for an improved control cable apparatus which can effectively actuate, retain and release a control cable under moderate to high levels of tension.

SUMMARY OF THE INVENTION

It is thus an object of the present invention to provide a control cable assembly which is useful for manual actuation, retention and release of a control cable which is under moderate to high levels of tension, with significant cable travel, particularly in the environment of use of lawn, garden, and light utility tractors.

It is another object of the present invention to provide such a self locking control cable apparatus hereof is economical to manufacture and install in a control panel, durable in rugged conditions without requiring significant (if any) maintenance, and presents desirable ergonomic characteristics without extensive machining, a large number of parts, or complicated assembly requirements.

It is a further object of the present invention to provide a self locking control cable assembly hereof which retains the cable in an actuated condition with the control cable under tension but without the tension load being borne by a shiftable control handle of the assembly during engagement.

It is an additional object of the present invention to provide a self locking cable control apparatus which can be mounted to a control panel or the like and accommodate relatively long cable travel under moderate to high cable tension without necessitating control handles of excessive length which would be incompatible with use on a control panel.

In accordance with these and other objects evident from the following description of a preferred embodiment of the invention, a self locking cable control assembly is provided which is particularly useful for mounting to a lawn, garden, or utility tractor to control mechanisms such as a PTO where the mechanism is to be manually actuated by a control cable between an engaged and disengaged condition. The self locking cable control apparatus also avoids then need for excessive manual force to be applied to the handle, or handles of excessive length, given the relatively high tension and long cable travel. The self locking cable control assembly is preferably mounted to the frame, body part, such as a control panel, or other structure of the tractor. By shifting a control handle to from a first position to a second position, the control cable is retained in an engaged position and, correspondingly, the mechanism is engaged. However, the tension force carried by the control cable from the mechanism is borne internally by a pawl within the control assembly once the handle is shifted to the second position, and not transferred to the handle. When the user desires to return the mechanism to a disengaged condition, the handle may be easily shifted back from the second position to the first position, with a pivotal member operatively connected to but separate from the handle serving to release the pawl and thereby permit the cable to shift back under tension to the disengaged condition. Advantageously, this disengagement is effected by a controlled release of the pawl and return of the cable, to inhibit snap movements of the handle and rapid changes in tensioning to the cable during disengagement.

The self locking control cable assembly hereof broadly includes a Bowden cable having a sheath and a control cable shiftably movable therewithin, a housing to which one end of the sheath is mounted, a handle mounted for shiftable movement relative to the housing, a driving member connected to the handle for shiftable movement therewith, a driven member operatively connected to the driving member for movement responsive to movement of the driven member, and a pawl mounted for pivotal movement relative to the housing and biased into engagement with both the driving member and the driven member. The control cable is operatively connected to the driven member, whereby pivotal movement of the driven member results in movement of the control cable relative to the housing and the sheath.

The driven member is operatively positioned for engagement with the pawl, which is biased by a spring against the driven member. The driven member includes structure, preferably a slot, which receives a post extending from the driving member, whereby the post is permitted limited travel within the slot before it contacts one or another end of the slot. The driven member also preferably includes a circumferentially extending wall. The circumferentially extending wall presents a radially inwardly sloping ramp which ends in a substantially radially extending stop wall. The driving member also preferably includes a circular, circumferentially extending wall having a sloped recess which is oriented rotationally opposite the orientation of the ramp on the driven member, and also includes a radially oriented stop wall at one end. The ramp and the sloped recess are positioned to engage respective parts of the pawl as the driven member and driving member pivot within the housing. In this regard, as the driving member is pivotally moved from an initial position, a peg on the pawl moves radially inwardly along and into the ramp, biased by the spring. This in turn causes a retainer, preferably hook-shaped, on the pawl to hold the driven member, to which the proximate end of the cable is coupled, to hold the driven member and prevent its return when the driving member is in the advanced position. When the driving member is shifted back from the advanced position to the initial position, the driven member gradually moves the peg of the pawl radially outwardly, with the slot permitting relative movement between the driving member and the driven member. When the sloped recess of the driving member moves circumferentially a sufficient distance to cause the peg to move radially outwardly and clear the retainer from the stop wall, the tension on the cable is then able to cause the cable and the driven member to return to the initial position. While in the advanced position, however, the tensioning force on the cable is resisted by the pawl and the stop wall, and is not transferred to the driving member.

Thus, the present invention allows a relatively simple, easy to manufacture control assembly which is able to hold a cable in an advanced or engaged position where the tensioning force applied on the cable is relatively great, without transferring the tensioning load to the handle or driving member once shifted to the advanced position. This is advantageously accomplished through a self-locking and unlocking operation, which provides simplicity and permits control operation with only one hand. These and other advantages will be appreciated by those skilled in the art with reference to the drawings and description which follow.

BRIEF DESCRIPTION OF THE DRAWINGS

FIG. 3 is a front left side exploded perspective view of the cable control assembly hereof showing the driving member and driven member positioned between the housing halves and the boss on the interior of the right side housing half with the handle of the driving member in a second, engaged position;

FIG. 4 is a fragmentary rear right side perspective view of the cable control assembly hereof with the with the right side housing half removed to show a hook of the pawl riding on the circular outer surface portion of the end wall of the driven member with the handle, driving member and driven member in the initial position;

FIG. 5 is an fragmentary rear right side perspective view of the cable control assembly hereof, similar to FIG. 4, but showing the handle, driven member, and driving member in the second, engaged position, and the pawl engaging the cable of the cable control assembly in an advanced position with the hook of the pawl holding the driven member;

DESCRIPTION OF THE PREFERRED EMBODIMENT

Figure 1:
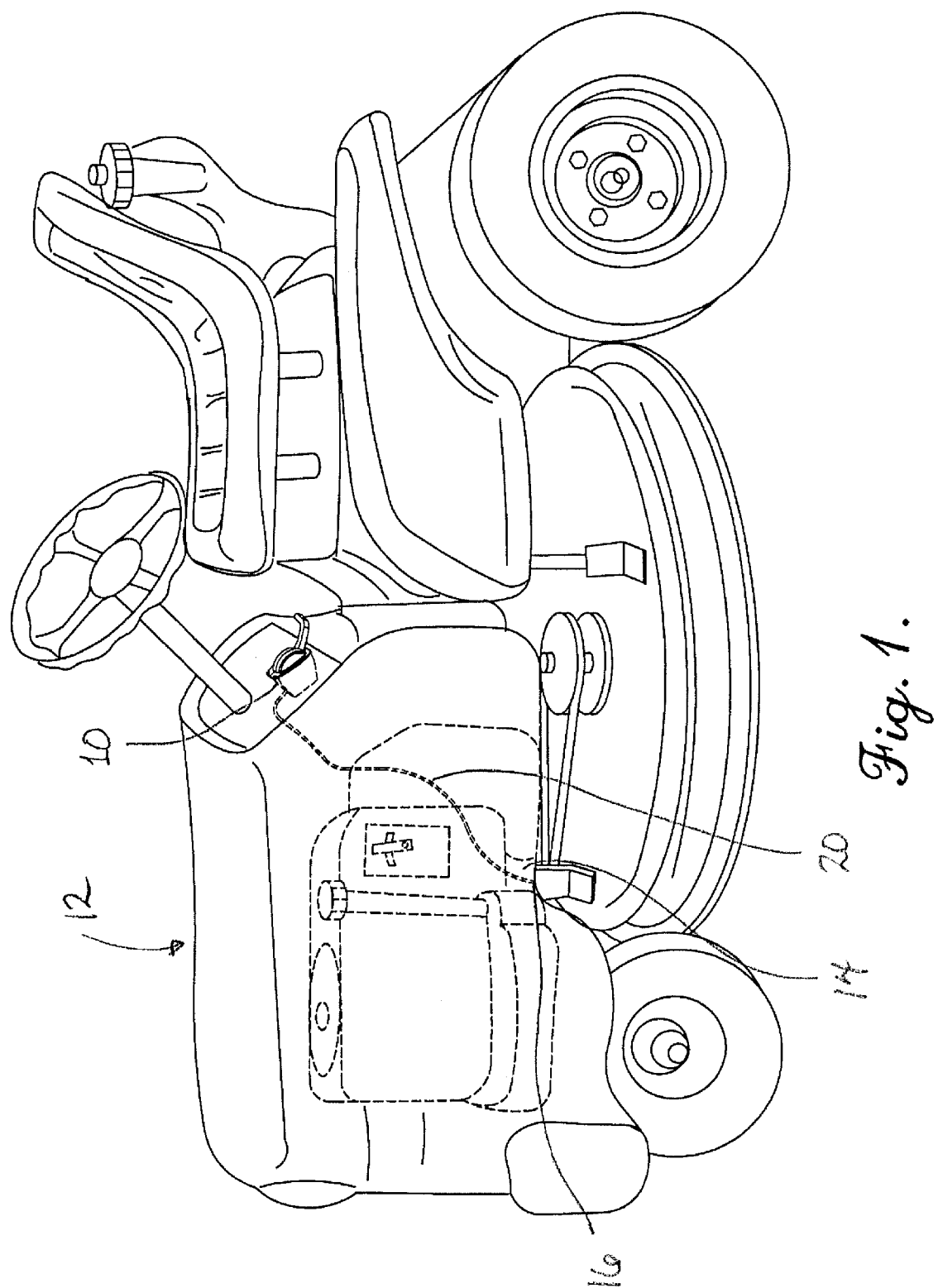
FIG. 1 is a perspective view of a tractor having an internal combustion engine with a power take-off operatively coupled to the cable control assembly of the present invention.

Referring now to the drawings, the cable control assembly 10 of the present invention is shown mounted on a vehicle such as a tractor 12. It is to be understood that the cable control assembly 10 is useful in connection with any other application where a controllable mechanism, such as a power-take-off unit 14 (PTO), is to be shifted between two conditions such as an engaged and a disengaged condition. The PTO 14 as illustrated is shown for operating a mower deck but could be used for other devices such as a snow thrower, rotary tiller, or the like, and the cable control assembly 10 could be used to operate a variety of other mechanisms such as a clutch, blade brake, or any other mechanism having two conditions of operation. Here, the PTO 14 includes a spring or other biasing device which applies a tension force to the remote end 16 of a cable 126 which is typically part of a Bowden cable assembly 20.

The cable control assembly 10 is shown in greater detail in FIGS. 2, 3, 4 and 5, and in the preferred embodiment includes the Bowden cable 20, a housing 22, a handle 24 which is connected to or provided as an integral molded assembly with a driving member 26, a driven member 28, and a pawl 30. Preferably, the pawl 30 is biased by a spring 32 against the driving member 26 and the driven member 28 as will be explained in greater detail herein. Threaded fasteners 34 are used to hold the components listed above together as part of the cable control assembly 10.

The housing 22 is preferably provided with first housing half 36 and second housing half 38, shown in FIGS. 2, 3, 4 and 5. It is to be understood that "half" does not mean exactly ½ of the mass or volume of the housing 22, but rather that the two halves 36 and 38 are to be mated together in opposing relationship and together provide the housing 22 of the cable control assembly 10 hereof. First housing half 36 includes a first sidewall 40, a first rim 42, and an upwardly projecting arcuate first half-dome 44. The second housing half 38 includes a complementally configured second sidewall 46, a second rim 48, and an upwardly projecting arcuate second half-dome 50. The outer surface 52 of each of the first sidewall 40 and the second sidewall 46 each include one or a plurality of clips 54 integrally molded into the sidewalls for permitting snap-fit insertion and retention of the housing 22 into an opening provided in a control panel of the tractor 12 or other mechanism to be controlled. The first and second rims 42 and 48 together with the clips 54 hold the cable control assembly 10 on a control panel or other supporting surface, with the part of the control panel surrounding the opening into which the cable control assembly 10 is received being held between the clips 54 and the first and second rims 42 and 48. The first half-dome 44 and the second half-dome 50 include arcuate guide rims 56 and 58 which help to retain and guide the driving member 26 during shifting, and also help to substantially enclose the cable control assembly 10 against the intrusion of dirt and other debris.

Figure 2:
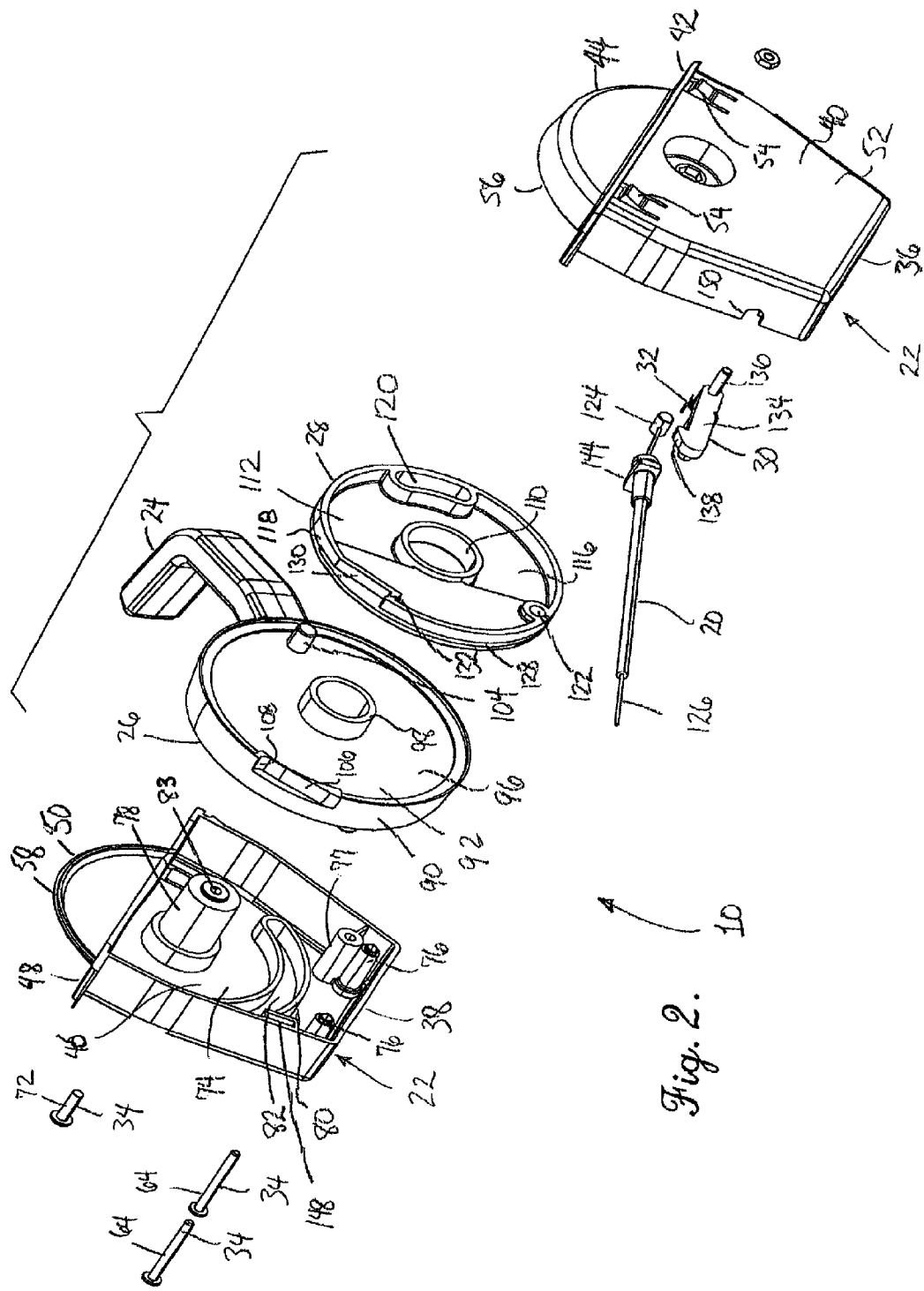
FIG. 2 is a front right side exploded perspective view of the cable control assembly hereof showing the driving member and driven member positioned between the housing halves and the spindle on interior of the left side housing half, with the handle of the driving member in an initial, disengaged position; with the right side housing half removed to show the driving member, driven member, handle and cable of the cable control assembly in an initial position.

The first sidewall 40 of the first housing half 36 has an first inside surface 60 which is best seen in FIG. 3. The first inside surface 60 includes a pair of receivers 62 which receive threaded fasteners 34 such as self-threading bolts 64, a bearing 66 for pivotally mounting the pawl 30, and a circular boss 68 which projects inwardly into the cable control assembly 10 and has a central hole 70 for receiving a bolt 72 or other fastener therethrough. The second sidewall 46 of the second housing half 38 includes a second inside surface 74 which is best seen in FIG. 2. The second inside surface 74 includes a pair of tubular passages 76 for receiving the bolts 64, the tubular passages 76 being aligned with the receivers 62 when the housing halves 36 and 38 are mated. The second inside surface 74 further includes a bearing 77 for pivotally mounting the pawl 30, a spindle 78 for pivotally mounting the driving member 26, and an arcuate inwardly projecting wall 80 which encloses and defines therein an arcuate-shaped sector 82. The sector 82 extends in an arcuate direction and is bounded by the wall 80 to define the limit of travel of the driving member 26 through its desired range of motion, typically about 30 degrees to about 80 degrees. The spindle 78 is substantially cylindrical but with a slight taper for purposes of molding, has a central hole 83 for receiving a threaded fastener therethrough, and is complementally configured to pivotally mount the driving member 26 thereon.

The handle 24 is preferably molded so as to be unitary with the driving member 26, and has an elongated shank 84 and a grip 86 extending angularly to the shank 84. The elongated shank 84 provides a significant lever arm to move the control cable 126 of the Bowden cable 20, which is maintained under tension.

The driving member 26 is preferably integrally molded as a unitary member with the handle 24 and includes an end wall 90 which is, at least in part, substantially circular, a sidewall 92 having a first side 94 and a second side 96, and a hub 98 which is sized for pivotal movement about the spindle 78. A plurality of gussets 100 are arranged in a spoke-type pattern, extend radially along and connected with the first side 94 of the sidewall 92, and also extend between and are connected to the end wall 90 and the hub 98 as shown in FIG. 3. One of the gussets 100 preferably has a substantially cylindrical lug 102 extending toward the sector 82 when mounted onto the spindle 78 whereby the lug is complementally shaped with the inwardly projecting wall 80 for travel within the wall 80 through the sector 82. Thus, the wall 80 both helps to maintain integrity and alignment of the cable control assembly 10 hereof, and to limit the pivotal movement of the driving member 26 because of engagement with the wall 80 at the limit of the travel of the lug 102. The sidewall 92 also includes a stub 104 which extends from the second side 96 and opposite the lug 102. Thus, the stub 104, which is preferably substantially cylindrical, thus extends in a direction toward the driven member 28 when the cable control assembly 10 hereof is assembled. The preferably circular circumferentially extending end wall 90 also includes a radially inwardly sloping recess 106 which ends in a radially extending stop wall 108. The recess 106 occupies only a portion of the end wall 90, with the remainder of the end wall 90 being substantially equidistant from the hub 98. The stop wall 108 is preferably at the end of the recess 106 proximal to the handle 24, and thus slopes upwardly away from the hub 98 as it extends circumferentially distal from the stop wall 108 and the handle to the ramp beginning 106.

The driven member 28 is substantially disc-shaped and includes a central bearing 110, a sidewall 112 having a first side 114 and a second side 116, and an end wall 118 which includes a portion which is preferably substantially circular.

The sidewall 112 includes a slot 120 which is elongated and arcuate in its circumferential direction and sized to receive the stub 104 of the driving member 26 therein. The sidewall also includes a transverse hole 122 for receiving a terminal 124 which is positioned at a proximate end of a control cable 126 of the Bowden cable 20. The end wall 118 includes a circumferentially extending slit 128 therein for receipt of the portion of the control cable 126 which is immediately adjacent the terminal 124 as the driven member 28 pivots, the slit 128 also serving as a guide for the control cable 126. The end wall 118 further includes, on a portion thereof which is preferably relatively remote from the slot 120, a radially inwardly sloping ramp 130 which ends in a substantially radially extending stop wall 132. as can be seen in FIGS. 2 and 3, the ramp 130 slopes in an opposite direction relative to the pivoting or circumferential movement of the recess 106 of the driving member 26. Thus, the stop wall 132 is, with respect to the circumferential or pivoting movements of the driving member 26 and the driven member 28, in facing relationship to the stop wall 108 of the recess 106.

The pawl 30 includes an elongated pawl arm 134 and a pivot shaft 136 which is oriented transverse to the longitudinal axis of the pawl arm 134. The pivot shaft 136, seen in FIGS. 3 and 4, is sized for receipt within the bearings 66 and 77 of the housing halves. The pivot shaft 136 is located at one end of the pawl arm 134, and a hook 138 is located at the opposite end of the pawl arm 134. The hook 138 extends radially inwardly and is sized for receipt by the ramp 130 of the driven member 28. A follower 140 is positioned on the pawl arm 134 adajacent the hook 138. The follower 140 is preferably substantially parallel to the axis of the pivot shaft 136 and relatively remote therefrom. The follower is oriented toward the driving member 26 and sized to ride along the end wall 90 until aligned with the recess 106 into which it is received when the cable control assembly 10 is assembled. The biasing spring 32 is mounted on the pawl 30 proximate the pivot shaft 136 with respective ends of the spring 32 engaging the housing and the pawl 30 to bias the hook 138 radially inwardly.

The Bowden cable 20 hereof includes the control cable 126 having the terminal 124 at the end proximate the housing 22 and a remote end operatively connected to the power take-off unit 14 or other controllable mechanism, and a sheath 142 as is conventional. The control cable 126 slides within the sheath 142, which is maintained against translational movement relative to the housing by fitting 144, which is received by receptacles 146 and 148 of the respective housing halves 36 and 38. The sheath 142 then leads through an opening 150 in one of the housing halves as shown, for example, in FIG. 3.

The control cable assembly 10 is assembled as illustrated in the drawing figures, with the terminal 124 connected to the driven member 28, the fitting 144 placed in one of the receoptacles 146 or 148, and the driving member 26 mounted on the spindle 78. Further, the pawl 30 is mounted with the spring 32 thereon and the shaft 136 received in the bearings 66 and 77, the lug 102 positioned within the sector 82, and the stub 104 within the slot 120. The two housing halves 36 and 38 are mated together, and the threaded fasteners 34 used to secure the housing halves.

Figure 6:
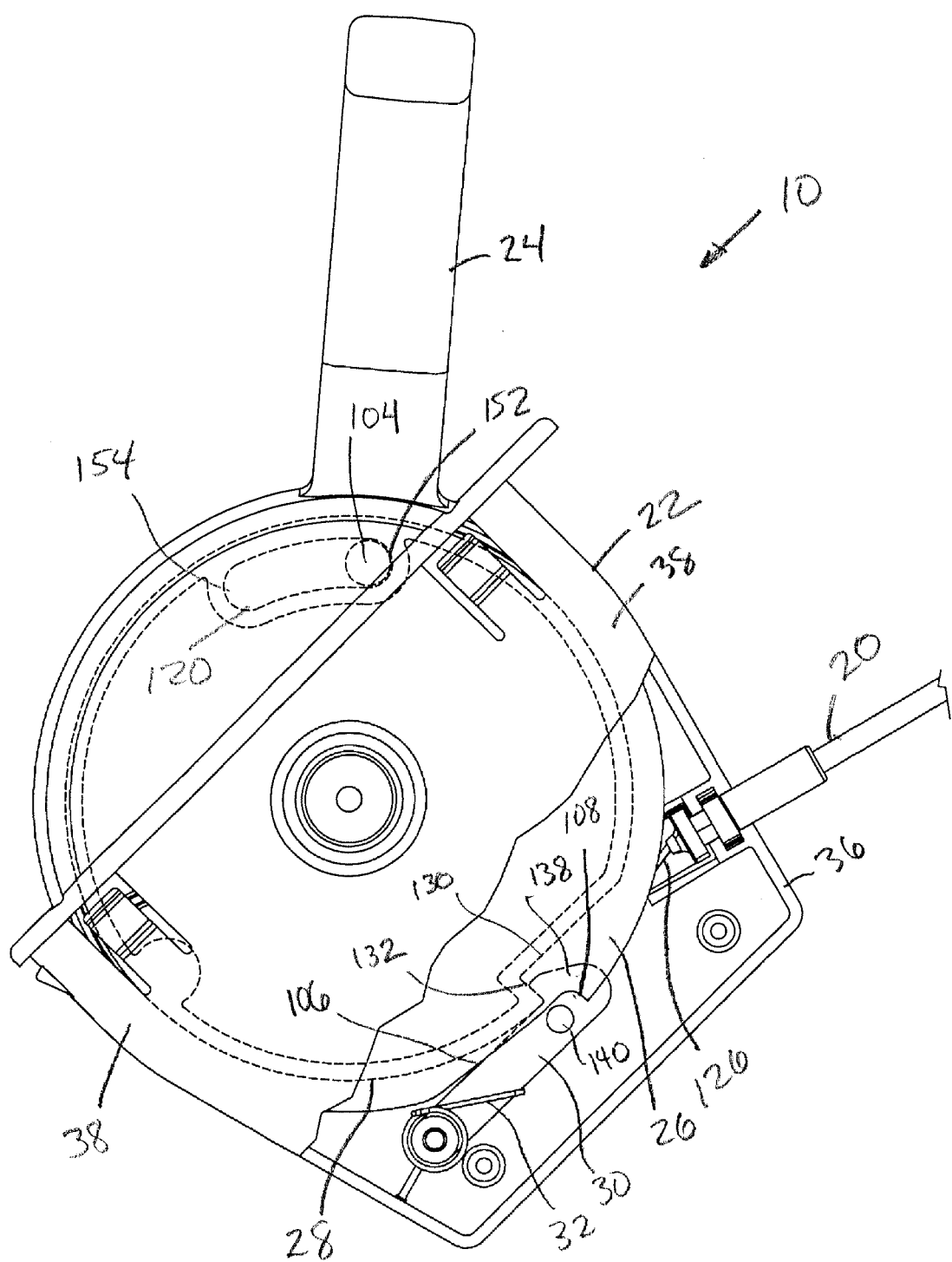
FIG. 6 is an enlarged, left side elevational view of the cable control assembly hereof, with portions of the driving member and driven member shown in phantom lines to illustrate the position of the stub of the driving member within the slot of the driven member and portions of the left housing half removed to show the hook of the pawl in engagement with the stop wall of the driven member when the handle is advanced to the second, engaged position.

In use, the handle 24 and thus the driving member 26 begin in an initial position shown in FIG. 4. In this position, the stub 104 is positioned at the circumferentially forward end 152 of the slot 120, such that as the handle 24 is moved forwardly toward the position shown in FIGS. 5 and 6, the driven member 28 pivots with the driving member 26. As the driving member 26 and driven member 28 pivot together about the axis defined by the spindle 78, the proximate end of the control cable 126 is received into the slit 128 and the retraction of the control cable 126 into the housing 22 begins to actuate the PTO 14 or other controllable mechanism. As viewed in FIG. 6, the forward movement of the handle causes both the driving member 26 and the driven member 28 to pivot in a clockwise direction. As the driven member 26 moves clockwise, the recess 106 of the driving member is no longer engaged by the follower 140, which frees the hook 138 to move radially inwardly, biased by the spring 32, once the driven member 28 moves a sufficient amount in the clockwise direction. The stub 104 continues to engage the sidewall adjacent the slot 120 until the hook 138 clears the stop wall 132. At that point, the hook 138 drops into the ramp 130. The handle 24 may then be released by the operator, and the tension applied to the control cable 126 actually aids in maintaining the hook 138 against the stop wall 132 to prevent counterclockwise movement of the driven member 28 which would, in turn, cause the unloading movement of the control cable in a remote direction. In this way, the tensioning force applied via the control cable 126 is borne by the action of the hook 138 on the driven member 28, and not transmitted to the driving member 26 or handle 24. Thus, notwithstanding the tension applied by the controllable mechanism 14 on the control cable 126 and the release of the handle 24 by the operator, the driven member 28 and thus the control cable 126 remains in its forward, engaged position as illustrated in FIG. 6. The stop wall 108 may also help, together with the other features herein listed, excess forward or clockwise movement of the driving member 26.

Figure 7:
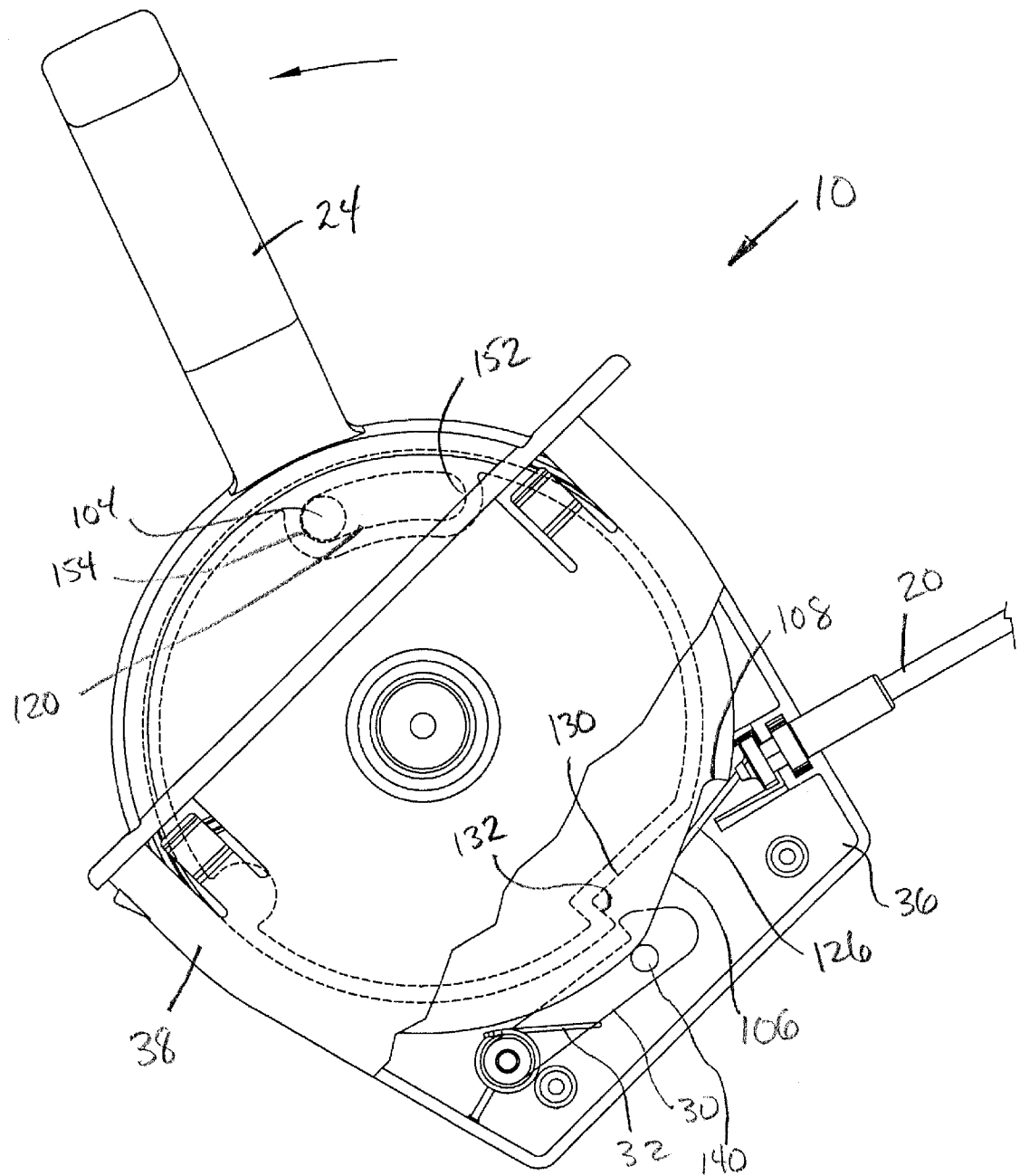
FIG. 7 is an enlarged, left side elevational view of the cable control assembly hereof, similar to FIG. 6, and showing the follower of the pawl lifting the hook of the pawl free from the stop wall as the handle is moved from the second, engaged position to the initial position.

When the operator desires to disengage the PTO 14, the only movement necessary is movement of the handle 24 rearwardly as illustrated in FIG. 7. During the movement of the handle rearwardly, and thus the counterclockwise movement of the driving member 26 as illustrated in FIG. 7, the circumferential extension of the slot 120 permits the stub 104 to move counterclockwise a desired distance before engaging the rearward end 154 of the slot 120. Thus, the driving member 26 is permitted limited counterclockwise pivoting movement relative to the driven member 28 which remains pivotably stationary, held in place by the hook 138. As the driving member 26 moves in a counterclockwise direction as illustrated in FIG. 7, follower 140 begins to ride along the sloping recess 106 and move radially outwardly relative to the axis or spindle 78. The follower 140 continues this radially outward movement until the follower 140 substantially moves out of the recess and thus onto the other portion of the end wall 118 which is here shown as substantially circular. This radially outward movement of the follower 140 causes the pawl 30 to pivot and the hook 138 to clear the stop wall 132. When the hook 138 clears the stop wall 132, the hook 138 no longer prevents counterclockwise movement of the driven member 28, which is now free to return to the initial position shown in FIG. 4, either as a result of the continued movement of the handle 24 rearwardly which in turn moves the driving member 26 with its stub 104 against the rearward end 154 of the slot 120, or as a result of tension applied to the control cable 126 and transferred through the driven member 28 to the driving member 26 and handle 24. As the driven member 28 moves counterclockwise, the control cable unloads and shifts relative to the sheath to permit the PTO 14 or other controllable mechanism to disengage.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the end walls of the driving member and driven member need not be substantially circular, but rather only a sector of an arcuate configuration may be provided. Also, the action of the control cable on the controllable mechanism may readily be a negative one, such that in the initial position, the controllable mechanism is engaged, and when the driving member is shifted clockwise, the controllable member disengaged. Of course, all descriptions of forward, rearward, clockwise and counterclockwise are provided to assist the reader in the understanding of the orientation as illustrated, and may be changed depending on the particular application and orientation of the cable control assembly in use.

The inventor hereby states his intent to rely on the Doctrine of Equivalents to determine and assess the reasonably fair scope of his invention as pertains to any apparatus not materially departing from but outside the literal scope of the invention as set out in the following claims.

The invention clamed is:

1. A self locking cable control assembly adapted for operating a remotely located mechanism via a control cable, the assembly comprising:
    a housing;
    a Bowden cable having a sheath mounted to the housing and a control cable shiftably received within the sheath;
    a driving member rotatably mounted in the housing and having a handle extending from the housing;
    a driven member rotatably mounted in the housing and operatively coupled to the driving member and to the control cable; and
    a locking member mounted to the housing for engaging the driving member and the driven member, whereby shifting of the driving member from an initial position to a second position produces complemental shifting of the driven member, the control cable and the locking member to hold the driven member and control cable against free return movement to the initial position, and whereby shifting of the driving member from the second position to the initial position causes the locking member to move from a holding relationship with the driven member and permit return of the driven member and control cable from the second position to the initial position.

2. A self locking cable control assembly as set forth in claim 1, wherein the locking member is a pawl.

3. A self locking cable control assembly as set forth in claim 2, including a spring for biasing the pawl into engagement with the driven member.

4. A self locking cable control assembly as set forth in claim 3, wherein the driven member and the driving member are pivotally mounted to the housing for movement about a common pivot axis.

5. A self locking cable control assembly as set forth in claim 4, wherein the handle extends externally of the housing and the driving member is positioned substantially within the housing.

6. A self locking cable control assembly as set forth in claim 5, wherein the driving member includes a substantially circular, circumferentially extending end wall having a radially extending sloped recess therein.

7. A self locking cable control assembly as set forth in claim 6, wherein the driven member includes a substantially circular, circumferentially extending end wall having a radially extending sloped ramp therein.

8. A self locking cable control assembly as set forth in claim 7, wherein the pawl includes a follower which is adapted for engagement with said driving member and receipt in said recess when said driving member is shifted.

9. A self locking cable control assembly as set forth in claim 8, wherein the pawl includes a hook which is adapted for engagement with said driven member and receipt in said ramp when said driven member is shifted, 10. A self locking cable control assembly as set forth in claim 9, where the sloped ramp is oriented circumferentially opposite the sloped recess.

11. A method of actuating a shiftable controllable mechanism, comprising the steps of:
   providing a cable control assembly having a locking member, a driving member and a driven member which is operatively connected to a control cable;
   operatively coupling the control cable to the controllable mechanism for shifting between an initial disengaged position and a second, engaged position;
   shifting the driving member from an initial position to a second position, thereby causing consequent shifting of the driven member and shifting of the control cable to shift the controllable mechanism from its initial position to its engaged position; and
   moving the locking member into a locking position for locking the driven member and the control cable in the second position, whereby force transmitted by the control cable to the driven member is not carried by the driving member.

12. A method as set forth in claim 11, including the step of shifting the driving member relative to the driven member in a direction from the second position toward the initial position for consequent unlocking of the locking member to permit return of the driven member and control cable to their initial position.

13. A method as set forth in claim 12, wherein the step of shifting of the driving member relative to the driven member from the second position toward the initial position includes the step of causing the driving member to shift the locking member out of locking engagement with the driven member.

14. A method of operatively disengaging a shiftable controllable mechanism operatively connectable to a power source comprising the steps of:
   providing a cable control assembly having a locking member, a driving member and a driven member which is operatively connected to a control cable;
   operatively coupling the control cable to the controllable mechanism for shifting between an initial disengaged position and a second, engaged position;
   operatively coupling the controllable mechanism to the power source when the control cable is in the second, engaged position; and
   shifting the driving member from the second position to the initial position, thereby causing consequent shifting of the driven member and shifting of the control cable to shift the controllable mechanism from an operatively coupled condition to a disengaged condition relative to the power source,
   wherein shifting of the driving member from the second position to the initial position causes consequent movement of the locking member from the locking position which locks the driven member and the control cable in the second position to an unlocked position whereby the driven member is unlocked from the locking member and able to shiftably return to the initial position corresponding to shifting of the driving member from the second position to the initial position.

15. A method as set forth in claim 14, wherein return of the driving member in a direction toward the initial position automatically causes the locking member to move free of the driven member and enable return of the driven member and control cable to the initial position without other unlocking steps.

16. A method as set forth in claim 15, wherein in the second position, force transmitted by the control cable to the driven member is not carried by the driving member, but upon movement of the driving member to move the locking member from the locking position to an unlocked position, force transmitted by the control cable to the driven member is further transferred to the driving member.

\* \* \* \* \*